United States Patent
Bhanage et al.

(10) Patent No.: US 9,730,155 B2
(45) Date of Patent: Aug. 8, 2017

(54) POWER SAVE AWARE MULTICAST SUPPORT

(71) Applicant: Aruba Networks, Inc., Sunnyvale, CA (US)

(72) Inventors: Gautam Bhanage, Sunnyvale, CA (US); Venkatesh Kannan, Bangalore (IN)

(73) Assignee: Aruba Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/610,670

(22) Filed: Jan. 30, 2015

(65) Prior Publication Data

US 2016/0309410 A1 Oct. 20, 2016

Related U.S. Application Data

(60) Provisional application No. 62/073,820, filed on Oct. 31, 2014.

(51) Int. Cl.
*H04W 52/02* (2009.01)
*H04L 29/06* (2006.01)

(52) U.S. Cl.
CPC ..... *H04W 52/0209* (2013.01); *H04L 65/4076* (2013.01); *Y02B 60/50* (2013.01)

(58) Field of Classification Search
None
See application file for complete search history.

(56) References Cited

U.S. PATENT DOCUMENTS

2009/0168681 A1* 7/2009 Moon ................ H04L 12/1854
370/312
2012/0051312 A1* 3/2012 Noh .................... H04W 76/023
370/329

\* cited by examiner

*Primary Examiner* — Sulaiman Nooristany
(74) *Attorney, Agent, or Firm* — Brooks, Cameron & Huebsch, PLLC (57) ABSTRACT

The present disclosure discloses a system and a method for providing power save aware multicast support. Specifically, a network device first determines that each of a first subset of client devices, of a plurality of client devices, is associated with a first characteristic indicating that the first subset of client devices is not in a power save mode. Based at least on the first determination, the network device transmits a message in a multicast format to the first subset of client devices. Second, the network device determines that each of a second subset of client devices, of the plurality of client devices, is associated with a second characteristic indicating that the second subset of client devices is in a power save mode. Based at least on the second determination, the network device transmits the message in a unicast format to each of the second subset of client devices.

20 Claims, 7 Drawing Sheets

POWER SAVE AWARE MULTICAST SUPPORT

RELATED APPLICATION

This application claims priority to U.S. Provisional Patent Application No. 62/073,820, entitled "Power Save Aware Multicast Support," filed on Oct. 31, 2014, the entirety of which is incorporated herein by reference. Also, this application is related to pending U.S. patent application Ser. No. 14/069,092, entitled "Enhanced Dynamic Multicast Optimization," by Gautam Bhanage, Abhijeet Bhorkar, Sathish Damodaran, filed on Oct. 31, 2013, the entirety of which is incorporated herein by reference.

FIELD

Embodiments of the present disclosure relate to network multicast optimization. In particular, embodiments of the present disclosure describe a system and a method for providing power save aware multicast support in a network.

BACKGROUND

In a large scale enterprise network infrastructure, when a video stream needs to be transmitted to a large number of client devices via multicast, in order to provide the optimal performance, the network infrastructure usually transmits the video stream to all of the client devices which subscribe to the multicast group in a true multicast mode. In the true multicast mode, no conversion is ever made from multicast transmission to unicast transmission. This would work well when all of the client devices are capable of achieving high performance.

Nevertheless, in reality, not all of the client devices subscribed to a multicast video stream will be high performance client. Some client devices may frequently switch in and out of power save mode. This would lead to poor network performance with increased delays and jitters.

To illustrate the problem, assuming that in the network infrastructure where 50 client devices are associated with an access point and subscribed to receive true multicast video traffic. Further, assuming that the access point has a delivery traffic indication message (DTIM) interval value set to 3 in order to optimize power save for mobile client devices.

In this case, if one of the client devices in the multicast group switches into power save mode, the network would have to buffer the multicast traffic and release it at every DTIM interval, which would be every 300 milliseconds. If the multicast traffic being streamed is a video feed, then the quality of the video will likely deteriorate because of increased delay and jitter. Currently, there is no good solution for handling such multicast client devices that are configured to switch to power save mode frequently while providing high network performance at the same time.

DETAILED DESCRIPTION

In the following description, several specific details are presented to provide a thorough understanding. While the context of the disclosure is directed to network multicast optimization, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

OVERVIEW

Embodiments of the present disclosure relate to network multicast optimization. In particular, embodiments of the present disclosure describe a method and system for providing power save aware multicast support in a network.

According to embodiments of the present disclosure, instead of making the all multicast client devices suffer from poor performance when one or a few client devices switch into power save mode, the network infrastructure can dynamically determine to convert multicast packets to unicast packets destined to only a subset of multicast client devices which frequently switch to power save mode. Meanwhile, the rest of the multicast client devices continue receiving multicast streams in true multicast mode.

As a result, a majority of the multicast client devices receive seamless true multicast network service. Moreover, even for the client devices whose multicast packets are converted to unicast packets, they will get serviced at every beacon interval (e.g., 100 milliseconds) instead of at every DTIM beacon interval (e.g., every 300 milliseconds). Therefore, embodiments of the present disclosure improve the overall capacity subject to the available capacity at the access point for converting a multicast stream to unicast packets.

Note that this is very different from converting the entire multicast to unicast which was conventionally done. For example, there may not be sufficient capacity available at the access point to convert the multicast stream to unicast packets for all client devices and the disclosed technique avoids that problem.

Upon receiving a power save notification from a particular client device, the disclosed network device marks that client device as being in power save mode. Based on whether that client is actively receiving multicast traffic, the network device decides to replicate the multicast packet and convert it to a unicast packet for that client device only, while passing the rest of the multicast traffic.

In some embodiments, the actual multicast frame management and DTIM buffering is performed in the micro-code instead of the host. In such cases, the network device can either (1) completely disable buffering of multicast traffic in the micro-code and manage all state on the host, or (2) selectively update the power save state by writing to shared memory.

With the solution provided herein, a network device first determines that each of a first subset of client devices, of a plurality of client devices associated with that network device, is associated with a first characteristic, such as being switched in and out of power save mode infrequently. Based at least on the first determination, the network device transmits a message in a multicast format to the first subset of client devices. Second, the network device determines that each of a second subset of client devices, of the plurality of client devices, is associated with a second characteristic, such as being switched in and out of power save mode frequently. Based at least on the second determination, the network device transmits the message in a unicast format to each of the second subset of client devices.

Networking Environment

Figure 1:
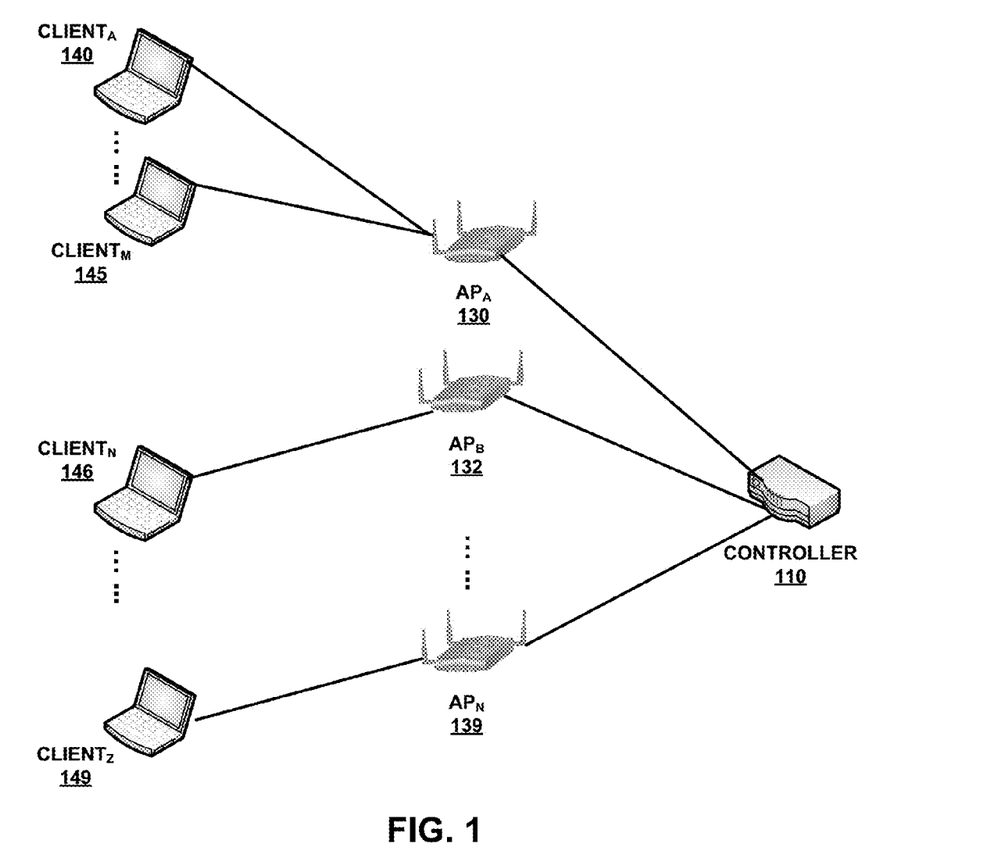
FIG. 1 shows an exemplary network environment according to embodiments of the present disclosure.

FIG. 1 shows an exemplary network environment according to embodiments of the present disclosure. The network environment as illustrated in FIG. 1 includes at least a controller 110, a number of APs, such as $AP_A$ 130, $AP_B$ 132, ..., $AP_N$ 139, and a number of client devices, such as $Client_A$ 140, ... $Client_M$ 145, $Client_N$ 146, ..., $Client_Z$ 149, etc.

Each AP provides network services to zero or more client devices. For example, in FIG. 1, $AP_A$ 130 serves client devices $Client_A$ 140, ... $Client_M$ 145. A second AP $AP_B$ 132 provides network services to at least $Client_N$ 146, etc. A third AP $AP_N$ 139 may provide network services to at least $Client_Z$ 149, etc.

Client devices, such as, ClientA 140 to ClientZ 149, can be mobile client devices supporting wireless network standards, such as IEEE 802.11, Bluetooth or other similar standards. Moreover, client devices may have the capability of switching to power save mode. When a client device sends a notification to the network infrastructure that it will switch to the power save mode, the network infrastructure will buffer any network packets destined to the client device and send a notification to the client device indicating that network packets are available. The client device will receive the buffered packets when it wakes up from the power save mode.

Network controller 110 generally refers to a controlling device that manages other network devices such as a WLAN controller that manages wireless access points. Network controller 110 may handle automatic adjustments to radio frequency power, wireless channels, wireless authentication, and/or security for the network devices it controls.

Triggers of Multicast-to-Unicast Conversion

According to embodiments of the present disclosure, a network device can store a station entry for each client device. The station entry tracks at least whether a particular client device currently is in the power save mode or not in the power save mode.

There are multiple possible triggers of multicast-to-unicast conversion. In some embodiments, whenever a client device switches to power save mode, it will trigger the network infrastructure to initiate the multicast-to-unicast conversion. In some embodiments, the network infrastructure may observe how frequently within a set period of time a client device switches in and out of power save mode while receiving a video multicast stream. If the number of times that a particular client device switches in and out of power save mode during that period exceeds a threshold value, the network infrastructure will initiate a multicast-to-unicast conversion for that particular client device.

In order to determine whether a client device is receiving video multicast traffic, the network infrastructure can utilize information in the wireless multimedia (WMM) priority queue saved in the driver. For example, a "VO" value indicates that the client device is receiving voice traffic, whereas a "VI" value indicates that the client device is receiving video traffic.

Client Node List

Figure 2:
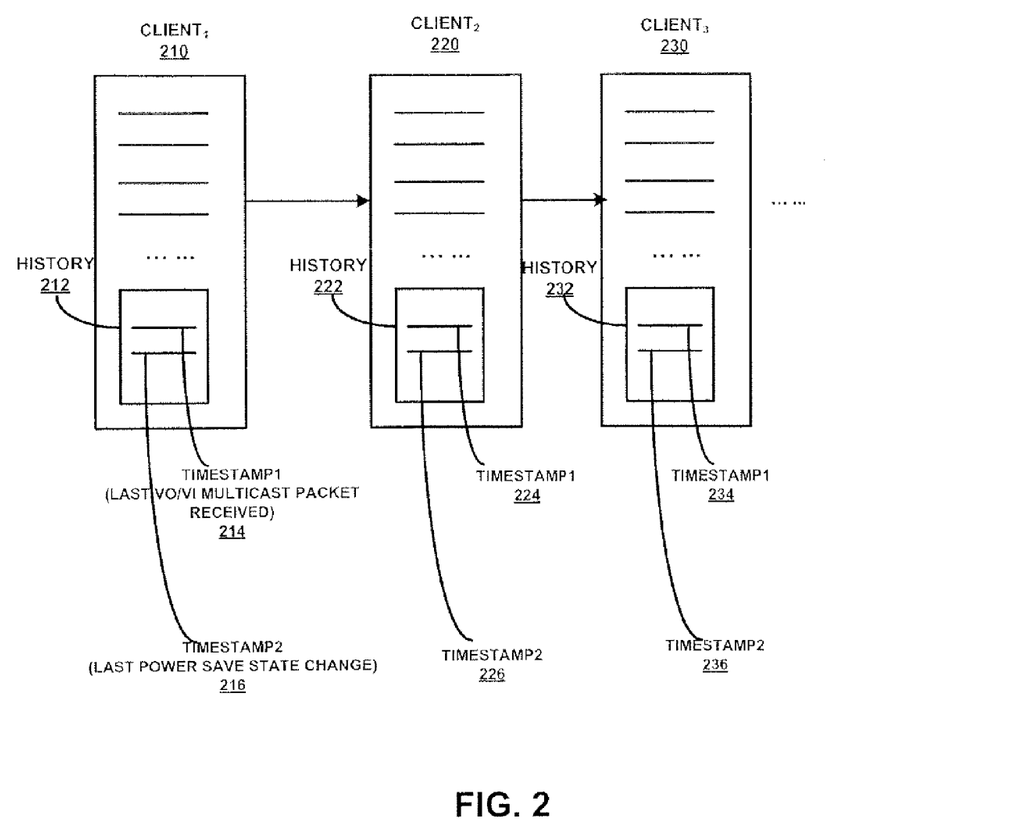
FIG. 2 shows a diagram illustrating an exemplary client node list according to embodiments of the present disclosure.

FIG. 2 shows a diagram illustrating an exemplary client node list as stored in the control path of a network controller according to embodiments of the present disclosure. A node list as illustrated in FIG. 2 includes at least a plurality of client nodes representing a plurality of client devices, e.g., $Client_1$ 210, $Client_2$ 220, $Client_3$ 230, etc. Each client node includes at least a history section that has at least two timestamps. The first timestamp indicates the last time the control plane of a network controller receives a voice or video multicast packet intended to be delivered to a particular client device in a multicast group. The second timestamp indicates when the client device last entered or exited power save mode. For example, for $Client_1$ 210, $timestamp_1$ 214 and $timestamp_2$ 216 are stored in history 212. Likewise, for $Client_2$ 220, $timestamp_1$ 224 and $timestamp_2$ 226 are stored in history 222; for $Client_3$ 210, $timestamp_1$ 234 and $timestamp_2$ 236 are stored in history 232. In this example, $timestamp_1$ indicates when a voice or video multicast packet was last received by the client device; and, $timestamp_2$ indicates when the client device last entered or exited power save mode.

Datapath Architecture

Figure 3:
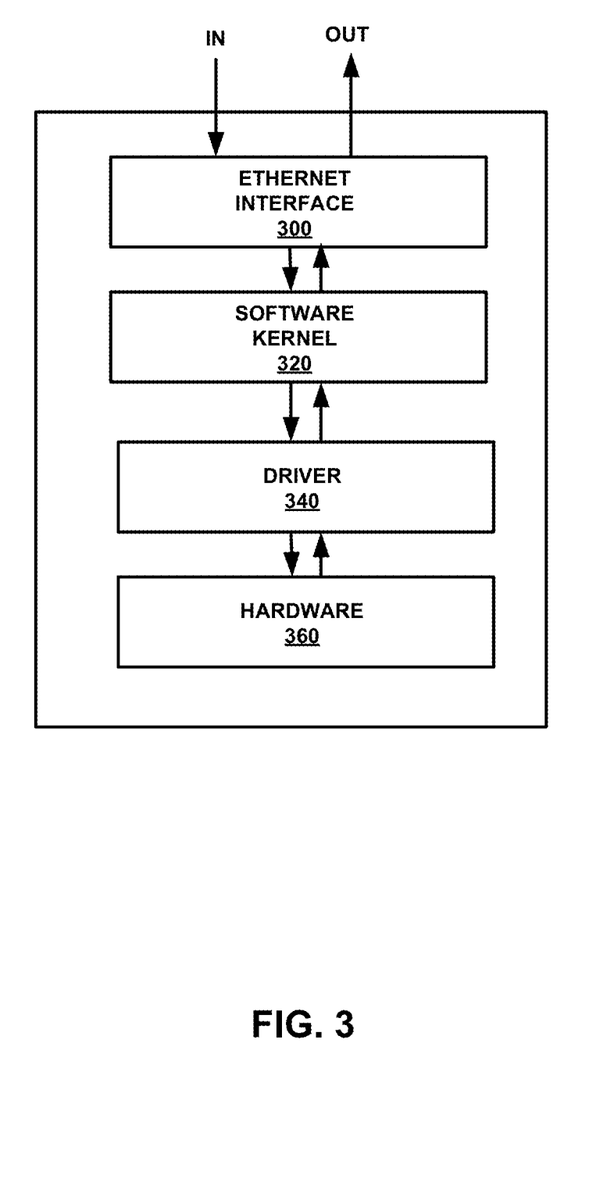
FIG. 3 shows a block diagram illustrating exemplary architecture according to embodiments of the present disclosure.

FIG. 3 shows a block diagram illustrating exemplary datapath architecture according to embodiments of the present disclosure. Datapath architecture as illustrated in FIG. 3 includes at least an Ethernet interface 300, a software kernel 320, a driver 340, and a hardware component 360. During operations, incoming packets are received via Ethernet interface 300 and passed on to software kernel 320, then driver 340, and hardware 360 for further processing. Moreover, processed packets are transmitted as outgoing packets via Ethernet interface 300. Within software kernel 320, power save aware multicast mechanism is supported according to embodiments of the present disclosure.

Datapath Architecture

Figure 4A:
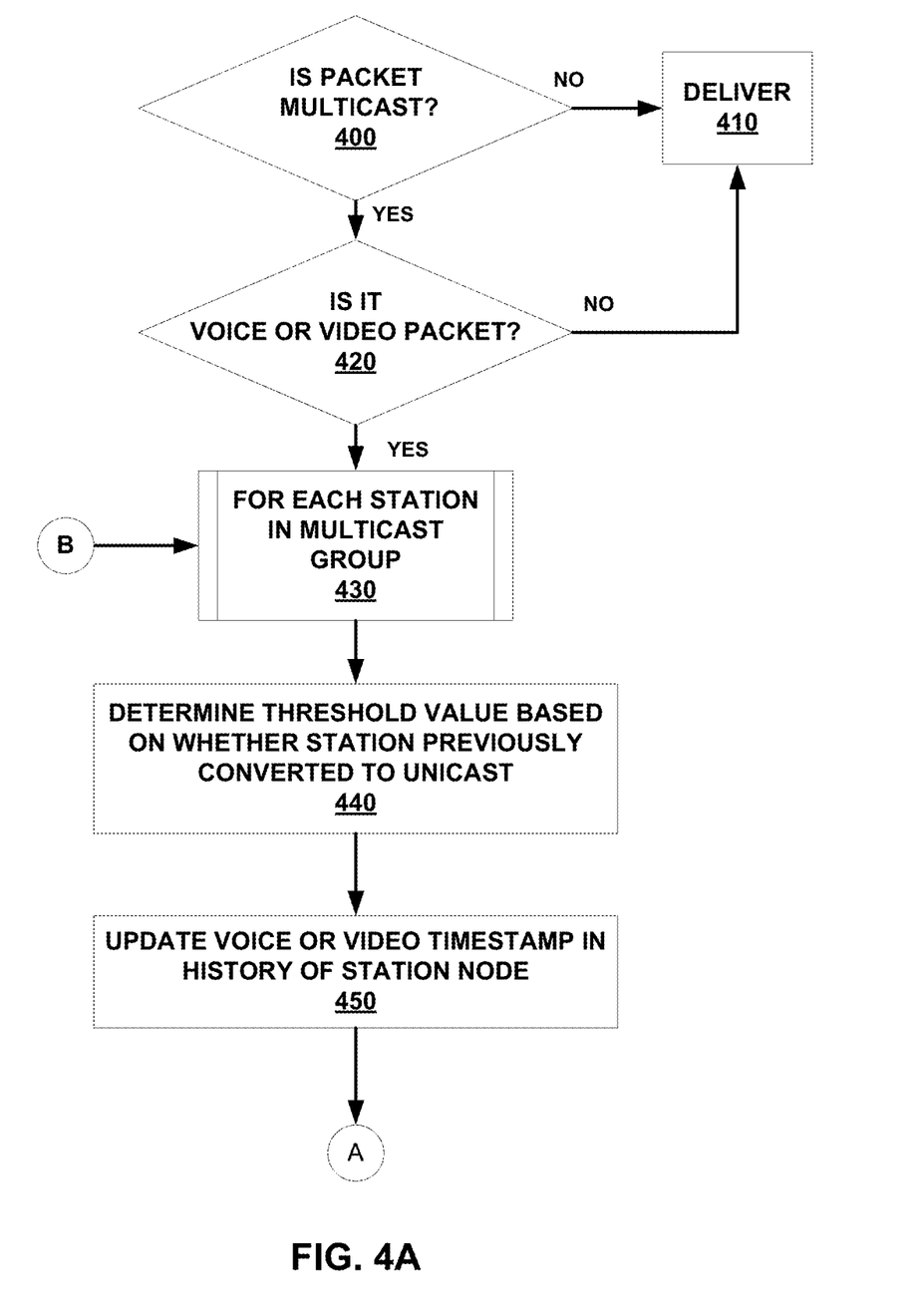
FIG. 4A-4B show flowcharts illustrating exemplary multicast support mechanisms according to embodiments of the present disclosure.
Figure 4B:
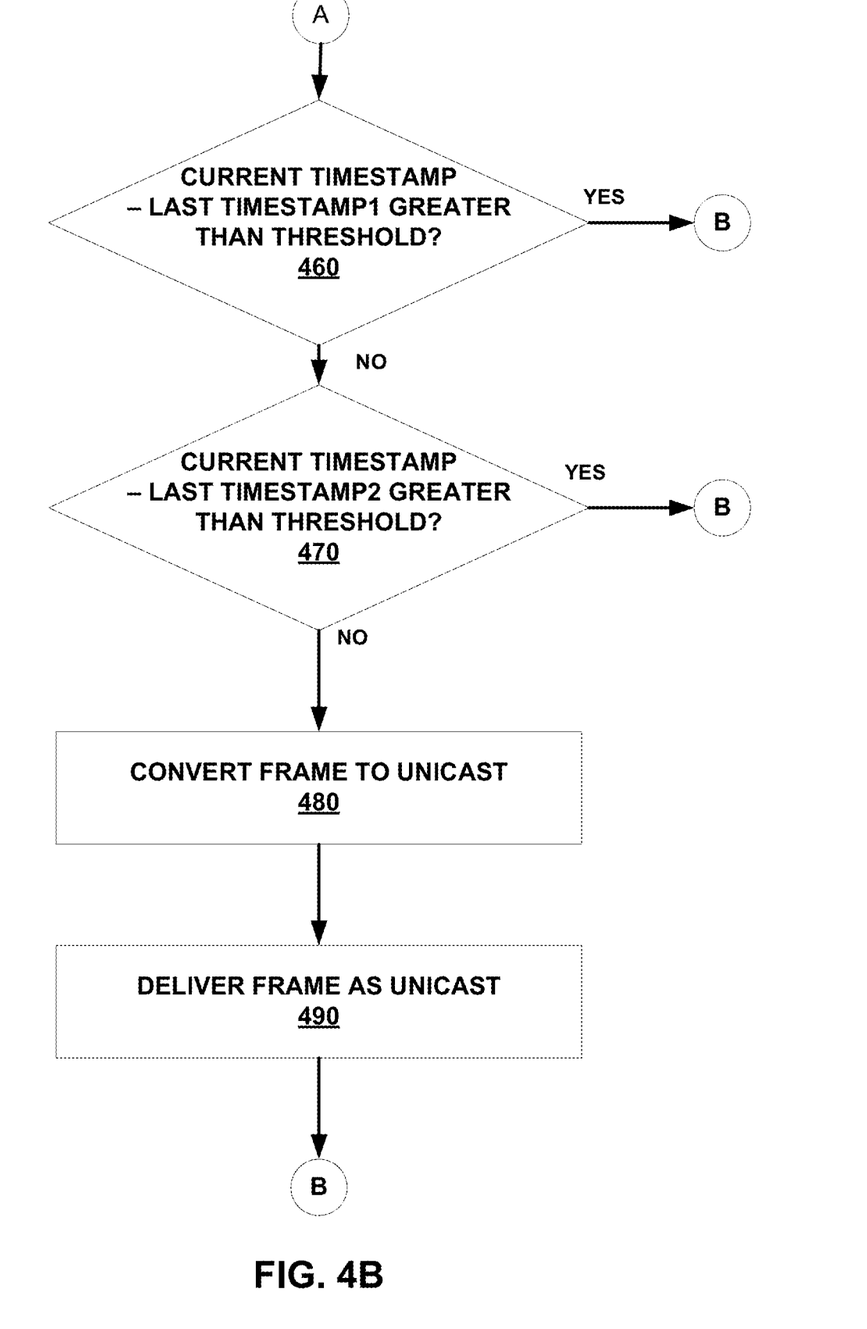

FIG. 4A-4B show flowcharts illustrating exemplary multicast support mechanisms according to embodiments of the present disclosure. First, the disclosed system determines whether a received packet is a multicast packet (step 400). If it is not a multicast packet, then the disclosed system proceeds to deliver the packet (step 410). Next, the disclosed system determines whether the received packet is a voice and/or video packet (step 420). If it is not a voice and/or video packet, then the disclosed system proceeds to deliver the packet (step 410).

If the received packet is a voice or video packet, then the disclosed system completes the following steps (1)-(5) for each wireless station (also referred to as "client device") in the multicast group 430:

(1) The disclosed system determines a threshold value based on whether the current station has previously been converted to unicast (step 440);

(2) The disclosed system updates the first timestamp (e.g., voice or video timestamp) in the history section of the client node list (step 450);

(3) If the difference between the current timestamp and timestamp$_1$ (e.g., last voice or video packet receipt time) is greater than the threshold value determined in (1), the disclosed system will move on to process for the next station in the multicast group (step 460);

(4) Otherwise, if the difference between the current timestamp and timestamp$_2$ (e.g., last power save mode switch time) is greater than the threshold value determined in (1), the disclosed system will move on to process for the next station in the multicast group (step 460);

(5) However, if both (a) the difference between the current timestamp and timestamp$_1$ and (b) the difference between the current timestamp and timestamp$_2$ are no greater than the determined threshold, then the disclosed system determines that the current station has been entering and/or exiting power save mode too frequently while receiving a video or voice multicast stream. In such cases, the disclosed system will convert the multicast frame to unicast frame destined to the current station (step 480), and delivers the converted frame as a unicast frame (step 490). Here, deliver means putting the converted frame in the unicast delivery queue instead of the delivery queue. Also, the system will remove the current station from the multicast group upon completing the multicast-to-unicast conversion. Then, the system proceeds to process the next station in the multicast group.

Hence, after completing steps (1)-(5) for each station in a multicast group, the disclosed system will convert the multicast packets to unicast packets (and put the converted unicast packets in the delivery queue) for only a subset of client devices satisfying certain criteria. For the rest of client devices, the disclosed system will place the packets in the delivery queue as multicast packets such that the voice or video multicast stream will be received by these client devices as usual in true multicast mode.

Note that, the multicast delivery mechanism is substantially different from unicast delivery mechanism. When the disclosed system multicast a voice or video packet to a subset of client devices, each client device in the subset will receive the same packet. On the other hand, when the disclosed system converts a multicast voice or video packet to a unicast packet for a subset of client devices, and delivers the converted unicast packets, each client device will receive its own copy of the packet that is different from the packet received by other client devices in the subset.

Without the present invention, even if only one client device out of the plurality of client devices associated with the network device frequently switches in and out of power save mode, because only one multicast frame will be delivered for all of the multicast client devices including the client device switching in and out of power save mode, the multicast frame would have to be queued and delivered at a DTIM interval when that client device would wake up. Because the network infrastructure typically optimizes the network to support client power save, the network infrastructure may be configured with a relatively infrequent DTIM interval. Therefore, all of the other multicast client devices would have to wait for a period (e.g., the DTIM interval) to receive the multicast frame. This delay can cause jittering or other undesirable effects. The disclosed system decreases this type of delay.

The disclosed system does not remove from multicast mode a client device that only occasionally switches into power save mode, because there is a cost associated with multicast-to-unicast conversion and with switching packet delivery to a particular client device between a multicast delivery queue and a unicast delivery queue. Whenever a switch of delivery queue is involved, the client device may receive a few packets out of order. Thus, it is undesirable to switch packet delivery for a particular client device between multicast delivery mechanism and unicast delivery mechanism very frequently. That is why the threshold value determined in (1) above is based on whether the current station has previously been converted to unicast. If a particular client device has already been converted to unicast, it is preferable to continue the unicast delivery mechanism for the particular client device for as long as possible to minimize the cost involved in the switching between the multicast delivery queue and the unicast delivery queue.

Process for Providing Power Save Aware Multicast Support

Figure 5:
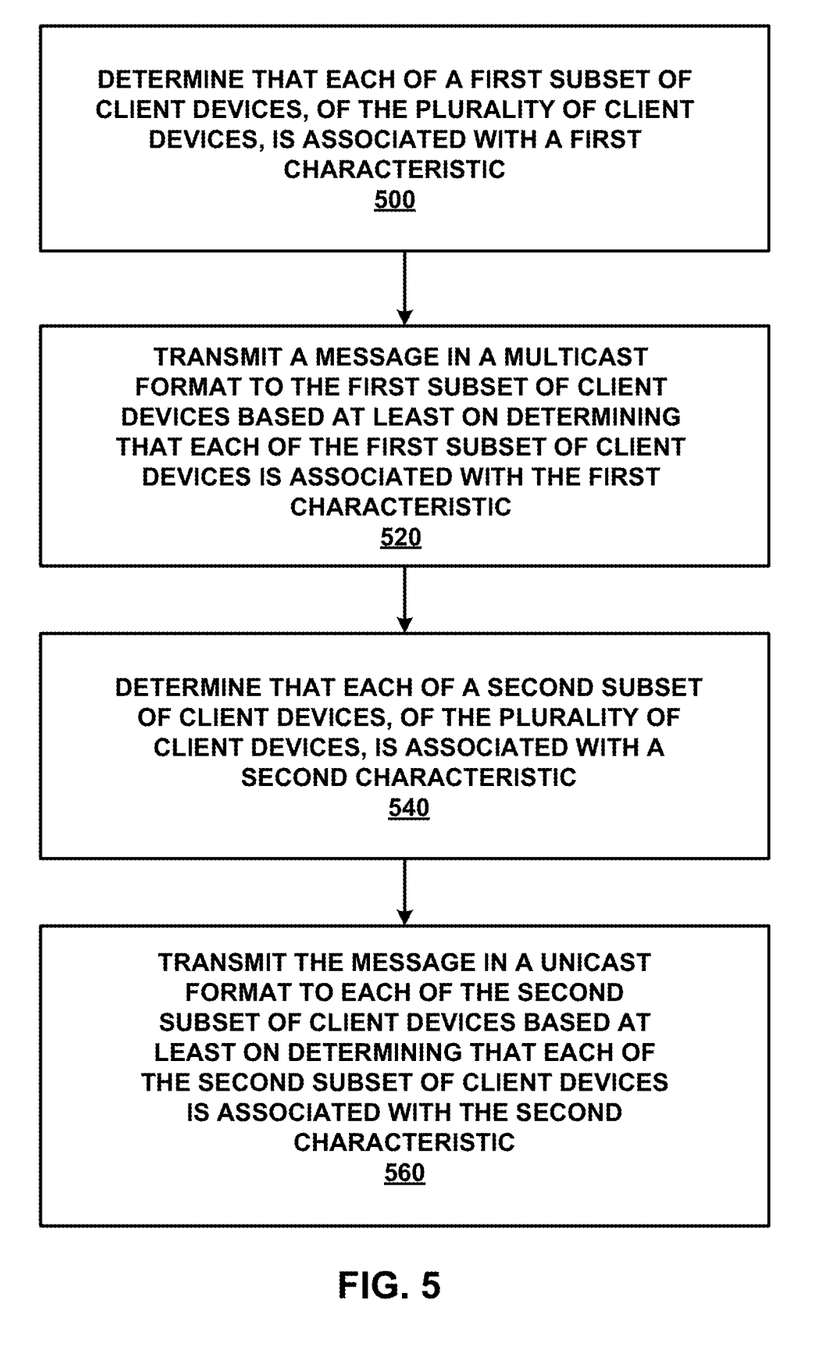
FIG. 5 illustrates an exemplary process for providing power save aware multicast support according to embodiments of the present disclosure.

FIG. 5 illustrates an exemplary process for providing power save aware multicast support according to embodiments of the present disclosure. During operations, a network device determines that each of a first subset of client devices, of the plurality of client devices associated with that network device, is associated with a first characteristic (operation 500). Based at least on determining that each of the first subset of client devices is associated with the first characteristic, the disclosed network device transmits a message in a multicast format to the first subset of client devices (operation 520). Moreover, the disclosed network device determines that each of a second subset of client devices, of the plurality of client devices, is associated with a second characteristic (operation 540). Based at least on determining that each of the second subset of client devices is associated with the second characteristic, the disclosed network device transmits the message in a unicast format to each of the second subset of client devices (operation 560).

In some embodiments, the first characteristic corresponds to a current client device state. In some embodiments, the first characteristic corresponds to historical client device state.

In some embodiments, the first characteristic indicates when a power saving mode was entered or exited by a client device. In some embodiments, the first characteristic corresponds to characteristics of data previously transmitted to the client device or received from the client device. In addition, the second characteristic indicates a client device is in a particular power saving mode, and wherein the first characteristic indicates that the client device is not in the particular power saving mode.

In some embodiments, the network device transmits a first media stream in unicast format to a particular client device in the plurality of client devices, and a second media stream in multicast format to the particular client device. Here, all data for any particular media stream is transmitted using a same format.

In some embodiments, transmitting the message in the multicast format to a particular device, in the first subset of client devices, is further responsive to determining that the particular device was not switched from multicast transmissions to unicast transmissions within a preconfigured period of time prior to the current time.

In some embodiments, determining that each of the second subset of client devices is associated with the second characteristic is based on receiving one or more notifications indicating (a) each of the second subset of client devices are associated with the second characteristic or (b) a time period when each of the second subset of client devices will be associated with the second characteristic.

In some embodiments, prior to transmitting the message in the unicast format to each of the second subset of client devices, the network device receives the message in the multicast format, and converts the message from the multicast format to the unicast format.

System for Providing Power Save Aware Multicast Support

Figure 6:
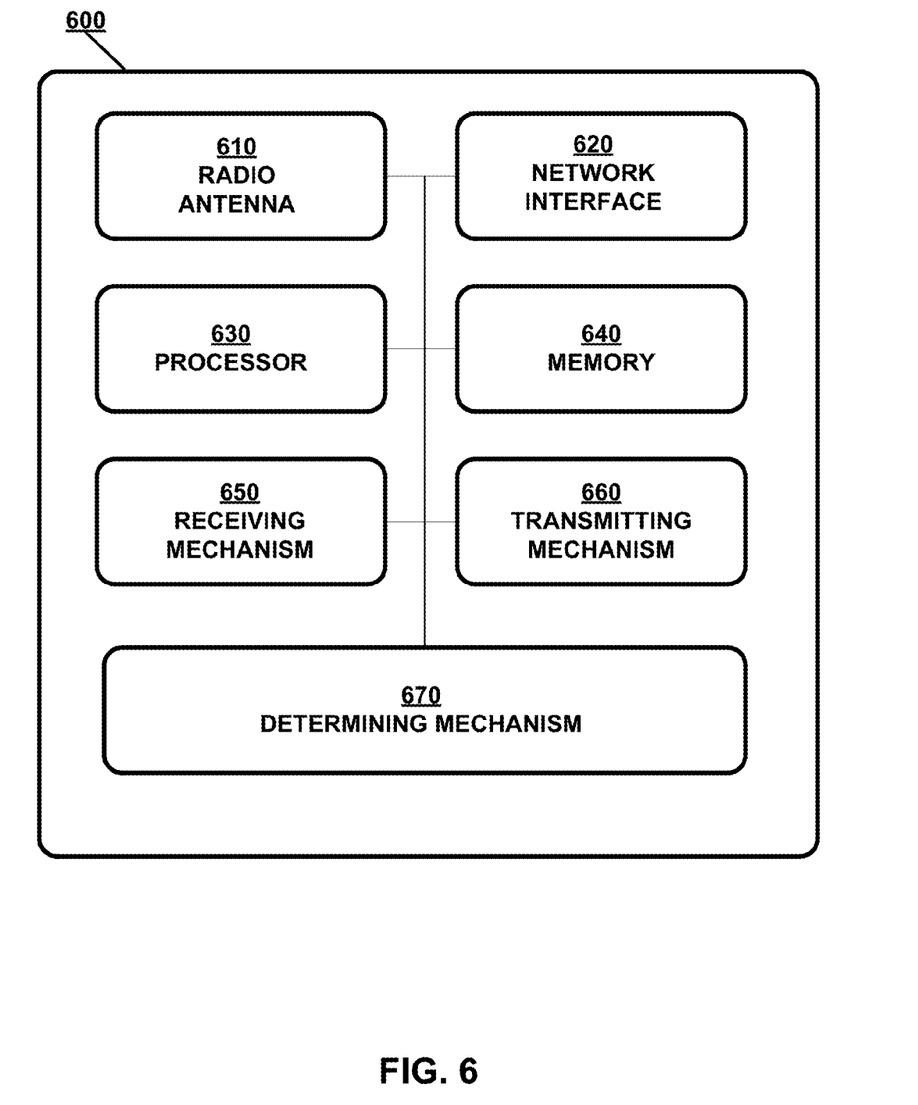
FIG. 6 is a block diagram illustrating an exemplary system for providing power save aware multicast support according to embodiments of the present disclosure.

FIG. 6 is a block diagram illustrating an exemplary system for providing power save aware multicast support according to embodiments of the present disclosure. Network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes a receiving mechanism 650, a transmitting mechanism 660, and a determining mechanism 670, all of which are in communication with processor 630 and/or memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors. Memory 640 can include storage components, such as, Dynamic Random Access Memory (DRAM), Static Random Access Memory (SRAM), etc.

Receiving mechanism 650 generally receives one or more network messages via network interface 620 or radio antenna 610 from a wireless client. The received network messages may include, but are not limited to, requests and/or responses, beacon frames, management frames, control path frames, and so on.

Transmitting mechanism 660 generally transmits messages, which include, but are not limited to, requests and/or responses, beacon frames, management frames, control path frames, and so on. Specially, transmitting mechanism 660 can transmit a first media stream in unicast format to a particular client device in the plurality of client devices, and transmit a second media stream in multicast format to the particular client device, where all data for any particular media stream is transmitted using a same format.

In some embodiments, transmitting mechanism 660 transmits the message in the multicast format to a particular device, in the first subset of client devices, in response to determining mechanism 650 determines that the particular device was not switched from multicast transmissions to unicast transmissions within a threshold amount of time from the current time.

In some embodiments, prior to transmitting mechanism 660 transmitting the message in the unicast format to each of the second subset of client devices, receiving mechanism 650 receives the message in the multicast format, and converts the message from the multicast format to the unicast format.

Determining mechanism 670 generally determines whether a subset of client devices is associated with a characteristic. In particular, determining mechanism 670 determines that each of a first subset of client devices, of the plurality of client devices, is associated with a first characteristic, such as being switched in and out of power save mode infrequently. Furthermore, determining mechanism 670 determines that each of a second subset of client devices, of the plurality of client devices, is associated with a second characteristic, such as being switched in and out of power save mode frequently.

If determining mechanism 670 determines that each of the first subset of client devices is associated with the first characteristic, transmitting mechanism 660 transmits a message in a multicast format to the first subset of client devices. If determining mechanism 670 determines that each of the second subset of client devices is associated with the second characteristic, transmitting mechanism 660 transmits the message in a unicast format to each of the second subset of client devices.

Here, the first characteristic may correspond to a current client device state, or a historical client device state. In some embodiments, the first characteristic indicates when a power saving mode was entered or exited by a client device. In some embodiments, the first characteristic corresponds to characteristics of data previously transmitted to the client device or received from the client device. Moreover, the second characteristic indicates a client device is in a particular power saving mode; and, the first characteristic indicates that the client device is not in the particular power saving mode.

In some embodiments, determining mechanism 670 determines that each of the second subset of client devices is associated with the second characteristic based on receiving one or more notifications indicating (a) each of the second subset of client devices are associated with the second characteristic or (b) a time period when each of the second subset of client devices will be associated with the second characteristic.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory in a volatile memory such as random access memory "RAM," or in a non-volatile memory such as read-only memory, power-backed RAM, flash memory, phase-change memory or the like; a hard disk drive; an optical disc drive; or any connector for receiving a portable memory device such as a Universal Serial Bus ("USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station, an access point, data transfer devices (such as network switches, routers, controllers, etc.) or the like.

As used herein, "access point" (AP) generally refers to receiving points for any known or convenient wireless access technology which may later become known. Specifically, the term AP is intended to include but not to be limited to IEEE 802.11-based APs. APs generally function as an electronic device that is adapted to allow wireless devices to connect to a wired network via various network and wireless communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer-readable storage medium comprising instructions which, when executed by one or more hardware processors, cause the one or more hardware processors to:
    determine that each of a first subset of client devices, of a plurality of client devices, is associated with a first characteristic pertaining to a power save mode;
    based at least on determining that each of the first subset of client devices is associated with the first characteristic, transmit a message in a multicast format to the first subset of client devices;
    determine that each of a second subset of client devices, of the plurality of client devices, is associated with a second characteristic pertaining to the power save mode; and
    based at least on determining that each of the second subset of client devices is associated with the second characteristic, transmit the message in a unicast format to each of the second subset of client devices,
    wherein the first and second characteristics correspond to at least one of: a current device state with regard to the power save mode, and a historical client device state with regard to the power save mode.

2. The medium of claim 1,
    wherein the first characteristic corresponds to a current client device state of not being in the power save mode, and
    the second characteristic corresponds to a current client device state of being in the power save mode.

3. The medium of claim 1,
    wherein the first characteristic corresponds to a historical client device state of not switching in or out of the power save mode within a threshold amount of time ago, and
    wherein the second characteristic corresponds to a historical client device state of switching in or out of the power save mode within the threshold amount of time ago.

4. The medium of claim 1, wherein the first characteristic further corresponds to characteristics of data previously transmitted to the client device or received from the client device.

5. The medium of claim 1,
    wherein the second characteristic corresponds to a historical client device state and indicates a client device is in the power save mode frequently, and
    the first characteristic corresponds to a historical client device state and indicates that the client device is in the power save mode infrequently.

6. The medium of claim 1, wherein the instructions are further to cause the one or more processors to:
    transmit a first media stream in unicast format to a particular client device in the plurality of client devices; and
    transmit a second media stream in multicast format to the particular client device;
    wherein all data for any particular media stream is transmitted using a same format.

7. The medium of claim 1, wherein determining that each of the second subset of client devices is associated with the second characteristic is based on receiving one or more notifications indicating (a) each of the second subset of client devices are associated with the second characteristic or (b) a time period when each of the second subset of client devices will be associated with the second characteristic.

8. The medium of claim 1, wherein the instructions are further to cause the one or more processors to:
prior to transmitting the message in the unicast format to each of the second subset of client devices:
receive the message in the multicast format; and
convert the message from the multicast format to the unicast format.

9. A system comprising: at least one device including a hardware processor and a non-transitory computer-readable storage medium storing instructions that, when executed by the hardware processor, cause the hardware processor to:
determine that each of a first subset of client devices, of a plurality of client devices, is associated with a first characteristic pertaining to a power save mode;
based at least on determining that each of the first subset of client devices is associated with the first characteristic, transmit a message in a multicast format to the first subset of client devices;
determine that each of a second subset of client devices, of the plurality of client devices, is associated with a second characteristic pertaining to the power save mode; and
based at least on determining that each of the second subset of client devices is associated with the second characteristic, transmit the message in a unicast format to each of the second subset of client devices,
wherein the first and second characteristics correspond to at least one of: a current device state with regard to the power save mode, and a historical client device state with regard to the power save mode.

10. The system of claim 9,
wherein the first characteristic corresponds to a current client device state of not being in the power save mode, and
the second characteristic corresponds to a current client device state of being in the power save mode.

11. The system of claim 9,
wherein the first characteristic corresponds to a historical client device state of not switching in or out of the power save mode within a threshold amount of time ago, and
wherein the second characteristic corresponds to a historical client device state of switching in or out of the power save mode within the threshold amount of time ago.

12. The system of claim 9, wherein the first characteristic further corresponds to characteristics of data previously transmitted to the client device or received from the client device.

13. The system of claim 9,
wherein the second characteristic corresponds to a historical client device state and indicates a client device is in the power save mode frequently, and
the first characteristic corresponds to a historical client device state and indicates that the client device is in the power save mode infrequently.

14. The system of claim 9, wherein the instructions are further to cause the hardware processor to:
transmitting a first media stream in unicast format to a particular client device in the plurality of client devices; and
transmitting a second media stream in multicast format to the particular client device;
wherein all data for any particular media stream is transmitted using a same format.

15. The system of claim 9, wherein determining that each of the second subset of client devices is associated with the second characteristic is based on receiving one or more notifications indicating (a) each of the second subset of client devices are associated with the second characteristic or (b) a time period when each of the second subset of client devices will be associated with the second characteristic.

16. The system of claim 9, wherein the instructions are further to cause the hardware processor to:
prior to transmitting the message in the unicast format to each of the second subset of client devices:
receive the message in the multicast format; and
convert the message from the multicast format to the unicast format.

17. A method of controlling a network device, comprising:
receiving a multicast message at the network device that is intended for delivery to a plurality of client devices;
determining, based on historic client device state information, that each of a first subset of client devices, of the plurality of client devices, has changed a power save mode infrequently and that each of a second subset of client devices, of the plurality of client devices, has changed the power save mode frequently;
based at least on determining that each of the first subset of client devices has changed the power save mode infrequently, causing the network device to deliver the multicast message in a multicast format to the first subset; and
based at least on determining that each of the second subset of client devices has changed the power save mode frequently, converting the multicast message into a unicast message and causing the network device to deliver the unicast message in a unicast format to the second subset.

18. The method of claim 17,
wherein the determining that each of the first subset of client devices has changed the power save mode infrequently includes determining, for each of the first subset, that at least one of:
an amount of time since the network device received a previous multicast message intended for the respective client device is greater than a threshold; and
an amount of time since a most recent power save mode change for the respective client device is greater than the threshold.

19. The method of claim 17,
wherein the determining that each of the second subset of client devices has changed the power save mode frequently includes determining, for each of the first subset, that:
an amount of time since the network device received a previous multicast message intended for the respective client device is less than a threshold; and
an amount of time since a most recent power save mode change for the respective client device is less than the threshold.

20. The method of claim 17, further comprising:
maintaining historical information for each of the plurality of client devices comprising:
a time that a previous multicast message intended for the respective client device was received at the network device; and
a time that the respective client device most recently changed the power save mode.

* * * * *